United States Patent
O'Rourke et al.

(10) Patent No.: US 7,509,590 B2
(45) Date of Patent: Mar. 24, 2009

(54) REPRESENTING THREE-DIMENSIONAL DATA

(75) Inventors: Mike William O'Rourke, Portland, OR (US); Michael John Russo, San Francisco, CA (US)

(73) Assignee: Autodesk, Inc., San Rafael, CA (US)

(*) Notice: Subject to any disclaimer, the term of this patent is extended or adjusted under 35 U.S.C. 154(b) by 754 days.

(21) Appl. No.: 10/897,207

(22) Filed: Jul. 22, 2004

(65) Prior Publication Data

US 2005/0050475 A1    Mar. 3, 2005

Related U.S. Application Data

(60) Provisional application No. 60/489,388, filed on Jul. 23, 2003.

(51) Int. Cl.
G06F 3/048 (2006.01)
G06F 3/00 (2006.01)

(52) U.S. Cl. .................. 715/853; 715/964; 715/855; 345/473; 345/474

(58) Field of Classification Search ................. 715/713, 715/967, 964, 763, 839, 853, 854, 855; 345/474, 345/473

See application file for complete search history.

(56) References Cited

U.S. PATENT DOCUMENTS

| | | | | |
|---|---|---|---|---|
| 6,714,201 | B1* | 3/2004 | Grinstein et al. | 345/474 |
| 6,999,084 | B2* | 2/2006 | Mochizuki et al. | 345/473 |
| 2003/0038836 | A1* | 2/2003 | Ronald et al. | 345/738 |
| 2005/0154708 | A1* | 7/2005 | Sun | 707/3 |
| 2005/0201285 | A1* | 9/2005 | Simonis | 370/235 |
| 2007/0104120 | A1* | 5/2007 | Shah-Heydari | 370/256 |

FOREIGN PATENT DOCUMENTS

GB    2353613 A    2/2001

* cited by examiner

*Primary Examiner*—Dennis Bonshock
(74) *Attorney, Agent, or Firm*—Patterson & Sheridan, LLP

(57) ABSTRACT

A machine-readable definition of a scene including three dimensional objects is represented. A schematic representation of the scene displays an object in which elements of the object are defined by nodes and relationships between these nodes are represented by links. Several unique relationship types are used to define specific functions applying to a node or between nodes. Selection data is received in response to user input that selects one of the relationship types. Appearance of the displayed links is modified so as to identify occurrences of the selected type to the user. Furthermore, a link may be added to display a relationship type defining a specific function for two or more nodes.

20 Claims, 20 Drawing Sheets

REPRESENTING THREE-DIMENSIONAL DATA

CROSS-REFERENCE TO RELATED APPLICATIONS

This application claims benefit of U.S. provisional patent application Ser. No. 60/489,388, filed Jul. 23, 2003, which is herein incorporated by reference.

BACKGROUND OF THE INVENTION

1. Field of the Invention

Embodiments of the present invention generally relate to representing a schematic of a scene including three dimensional objects and the relationships between the objects.

2. Description of the Related Art

The present invention relates to representing a machine-readable definition of a scene including three dimensional objects.

A problem associated with representing three-dimensional data is that a user often encounters difficulties in terms of identifying specific data of interest. This problem becomes more acute as data sets become larger.

SUMMARY OF THE INVENTION

The present invention generally facilitates the representation and display of three dimensional object data and relationships between object elements. A schematic representation of the scene displays an object in which elements of the object are defined by nodes and relationships between these nodes are represented by links. Several unique relationship types are used to define specific functions applying to a node or between nodes. Selection data is received in response to user input that selects one of the relationship types. Appearance of the displayed links is modified so as to identify occurrences of the selected type to the user. Furthermore, a link may be added to display a relationship type defining a specific function for two or more nodes.

One embodiment of a system and method for displaying a schematic representation of a scene includes receiving selection data input specifying one relationship type of a plurality of relationship types, modifying the appearance of any links representing the one relationship type to produce modified links, and displaying a schematic representation of the scene including nodes and the modified links, where the nodes are connected by the modified links and each link represents the one relationship type.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

FIG. 1

Figure 1:
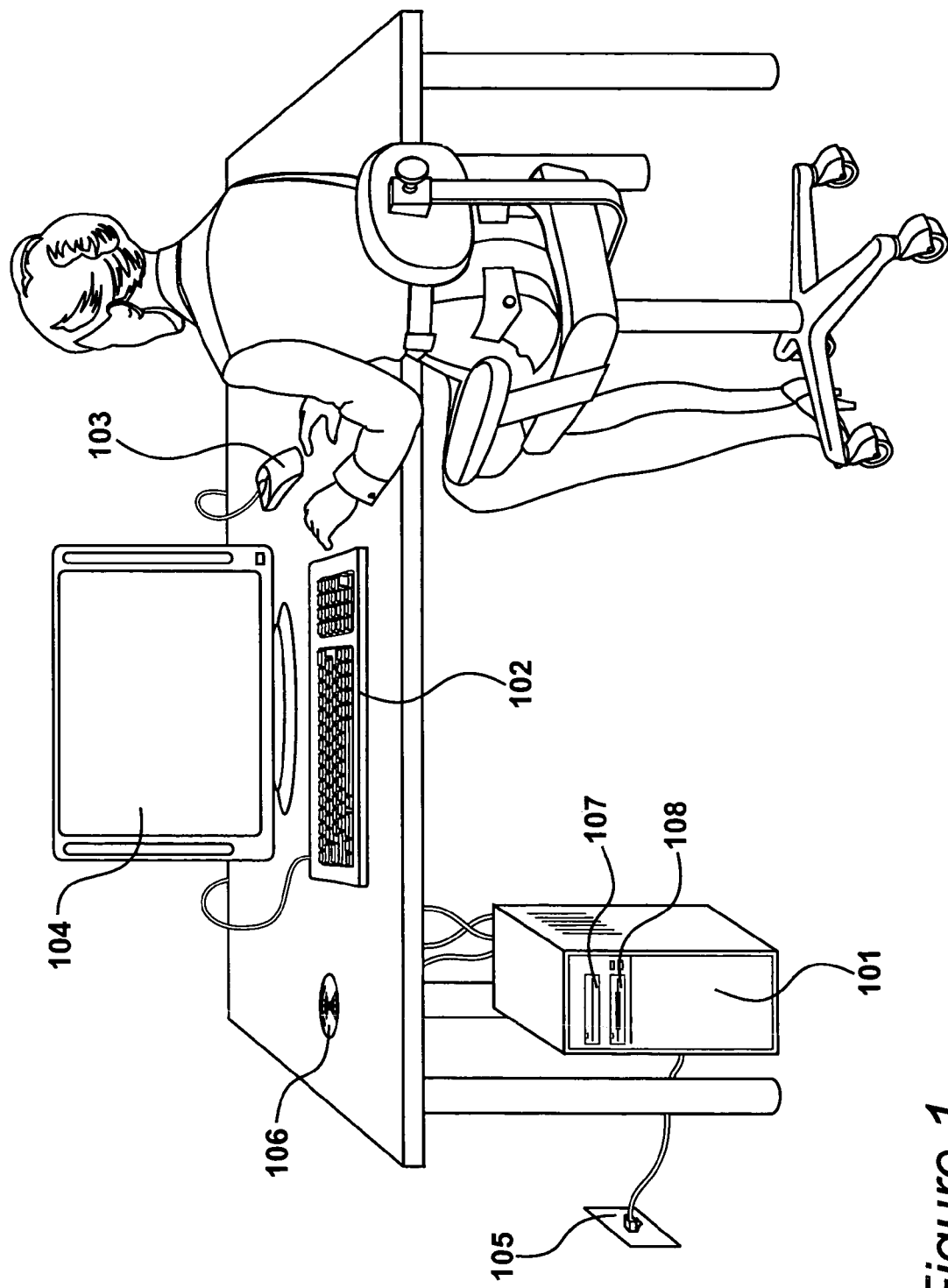
FIG. 1 shows an environment for representing a machine readable definition of a three-dimensional object, according to one embodiment of the present invention.

FIG. 1 shows an environment for representing a machine readable definition of a three-dimensional object, according to one embodiment of the present invention. Data processing is affected by a programmable computer system 101 that responds to input data from a user via a keyboard 102 and a mouse 103. Alternatively, other input devices may be used such as a stylus and tablet or a tracker-ball. Output data from computer system 101 is displayed to the user via a visual display unit 104. A network connection 105 allows computer system 101 to communicate with a local server and also facilitates communication externally via the internet.

Computer system 101 receives input data from the keyboard 102 and other input devices via cable connections although in alternative embodiments radio interfaces could be provided. Many different types of programmable computer system 101 could be deployed and in alternative embodiments of the present invention the functionality could be provided using dedicated hardware.

Instructions executable by computer system 101 are received by an instruction carrying medium such as a CD-ROM 106 or a similar instruction carrying medium such as a DVD etc. The computer system 101 may also have devices for recording output data, such as CD-ROM burners or DVD burner 107 or removable magnetic disk storage device 108, for example.

FIG. 2

Figure 2:
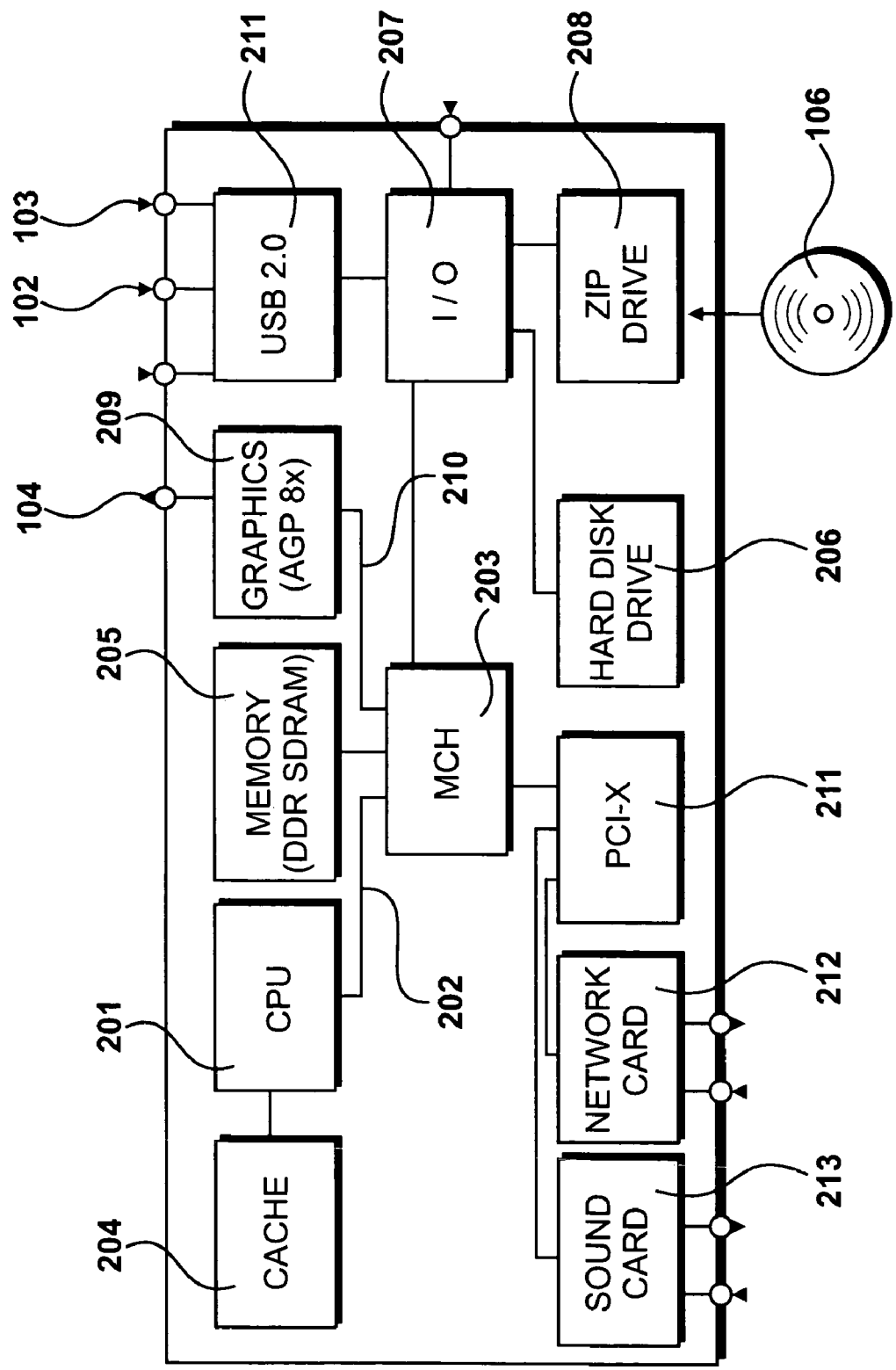
FIG. 2 shows the components of computer system shown in FIG. 1, according to one embodiment of the present invention.

FIG. 2 shows the components of computer system 101 are, according to one embodiment of the present invention. In some embodiments of the present invention, the components are based upon Intel® E7505 hub-based Chipset.

The system includes an Intel® Pentium™ Xeon™ DP central processing unit (CPU) 201 running at three Gigahertz (3 GHz), which fetches instructions for execution and manipulates data via an Intel® E7505 533 Megahertz system bus 202 providing connectivity with a Memory Controller Hub (MCH) 203. The CPU 201 has a secondary cache 204 comprising five hundred and twelve kilobytes of high speed static RAM, for storing frequently-accessed instructions and data to reduce fetching operations from a larger main memory 205 via the memory controller hub 203. The memory controller hub 203 thus co-ordinates data and instruction flow with the main memory 205, which is one gigabyte in storage capacity. Instructions and data are thus stored in the main memory 205 and the cache 204 for swift access by the CPU 201.

A hard disk drive 206 provides non-volatile bulk storage of instructions and data via an Input/Output Controller Hub (ICH) 207. The I/O controller hub 207 similarly provides connectivity to DVD-ROM re-writer 208 which reads the CDROM 106 shown in FIG. 1. Connectivity is also provided to USB 2.0 interface 211, to which the keyboard 102 and mouse 103 are attached, all of which send user input data to the processing system 101.

A graphics card 209 receives graphic data and instructions from the CPU 201. The graphics card 209 is connected to the memory controller hub 203 by means of a high speed AGP graphics bus 210. A PCI interface 211 provides connections to a network card 212 that provides access to the network 106, over which instructions and or data may be transferred. A sound card 213 is also connected to the PCI interface 211 and receives sound data or instructions from the CPU 201.

The equipment shown in FIG. 2 constitutes the components of a high-end IBM™ PC compatible processing system. In an alternative embodiment of the present invention, similar functionality is achieved using an Apple™ PowerPC™ architecture-based processing system.

FIG. 3

Figure 3:
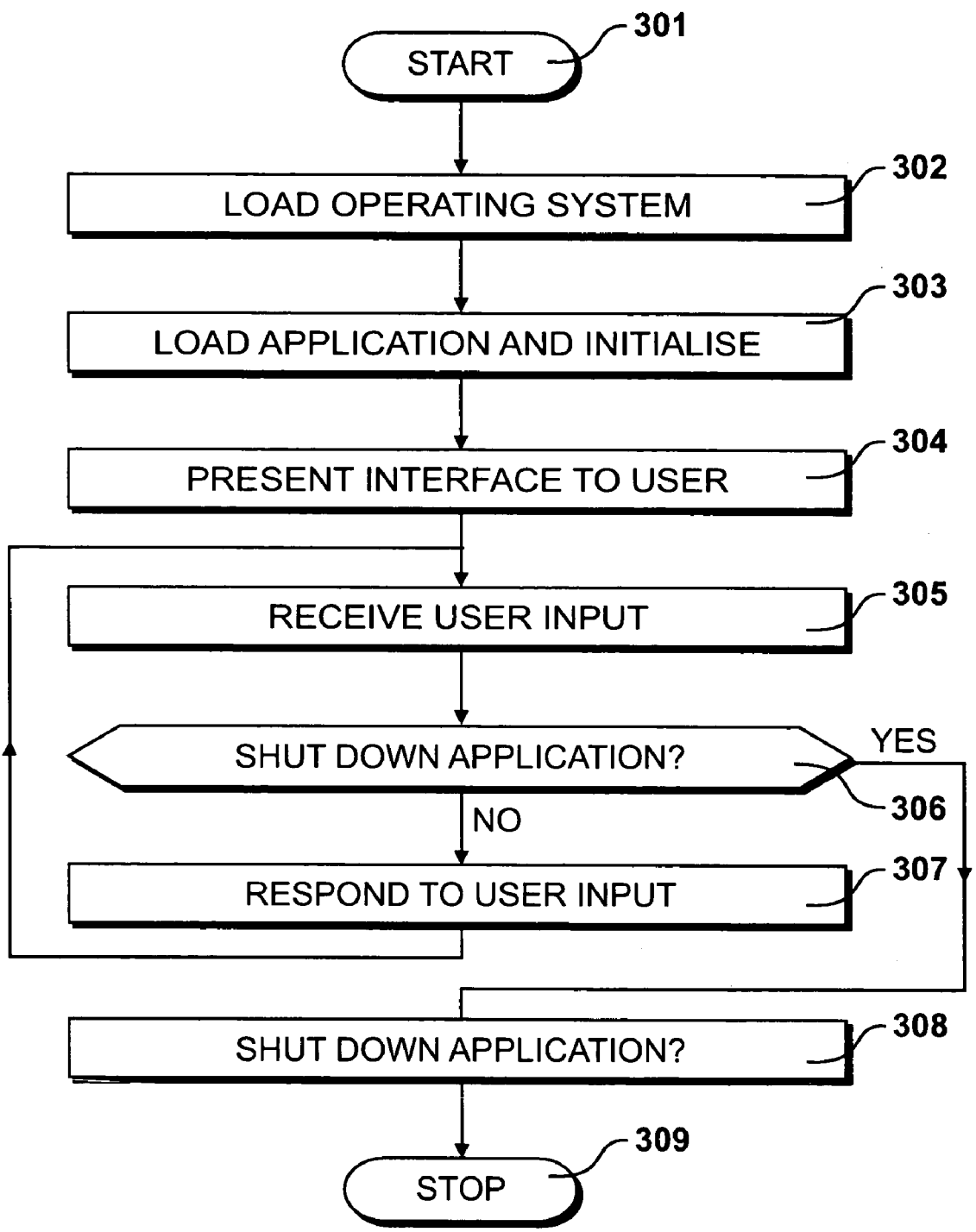
FIG. 3 shows operations performed by the system illustrated in FIG. 2, according to one embodiment of the present invention.

FIG. 3 shows operations performed by the system illustrated in FIG. 2, according to one embodiment of the present invention. After starting operation at step 301, instructions defining an operating system are loaded at step 302. In embodiments of the present invention, the operating system is Microsoft™ Windows™ but in alternative embodiments of the present invention other operating systems may be used such as MacX™, Unix™ or Linux™, for example.

At step 303 instructions for the application of one embodiment of the present invention are loaded and initialised resulting in a user interface being displayed at step 304.

At step 305 a user input command is received either in response to operation of a keyboard 102 or in response to operation of mouse 103.

At step 306 a question is asked as to whether a shutdown command has been received and if this question is answered in the affirmative the application is shut down at step 308 and the procedure is stopped 309. Alternatively, if the question asked at step 306 is answered in the negative, the application responds to the user input (received at step 305) at step 307. Thereafter, further input commands are received at step 305 and further responses are made at step 307 until a shutdown command is received and the question asked at step 306 is answered in the affirmative.

FIG. 4

Figure 4:
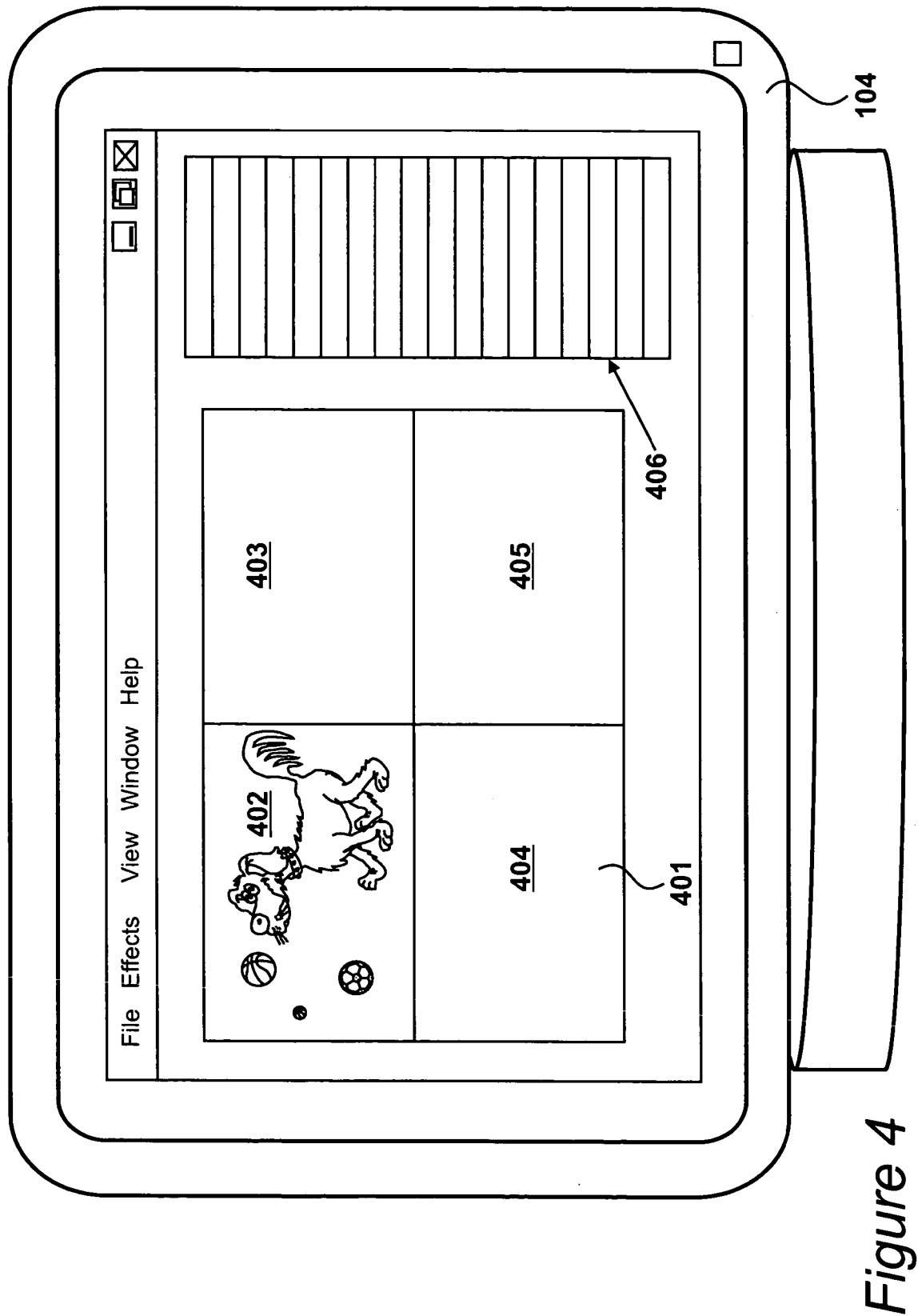
FIG. 4 shows a user interface generated after application loading, according to one embodiment of the present invention.

FIG. 4 shows a user interface, generated at step 304 as previously described, is displayed to a user via visual display unit 104, according to one embodiment of the present invention. A main display window 401 is divided into four tiles 402, 403, 404 and 405. Tile 402 displays a three-dimensional representation of an object or objects and orthogonal projections may be displayed in tiles 403 to 405. In addition, a window 406 displays a menu of functions that may be selected by cursor positioning in response to operation of mouse 103. Many functions are available within the system including functions for the generation and manipulation of schematic views as described with reference to the present embodiments.

FIG. 5

Figure 5:
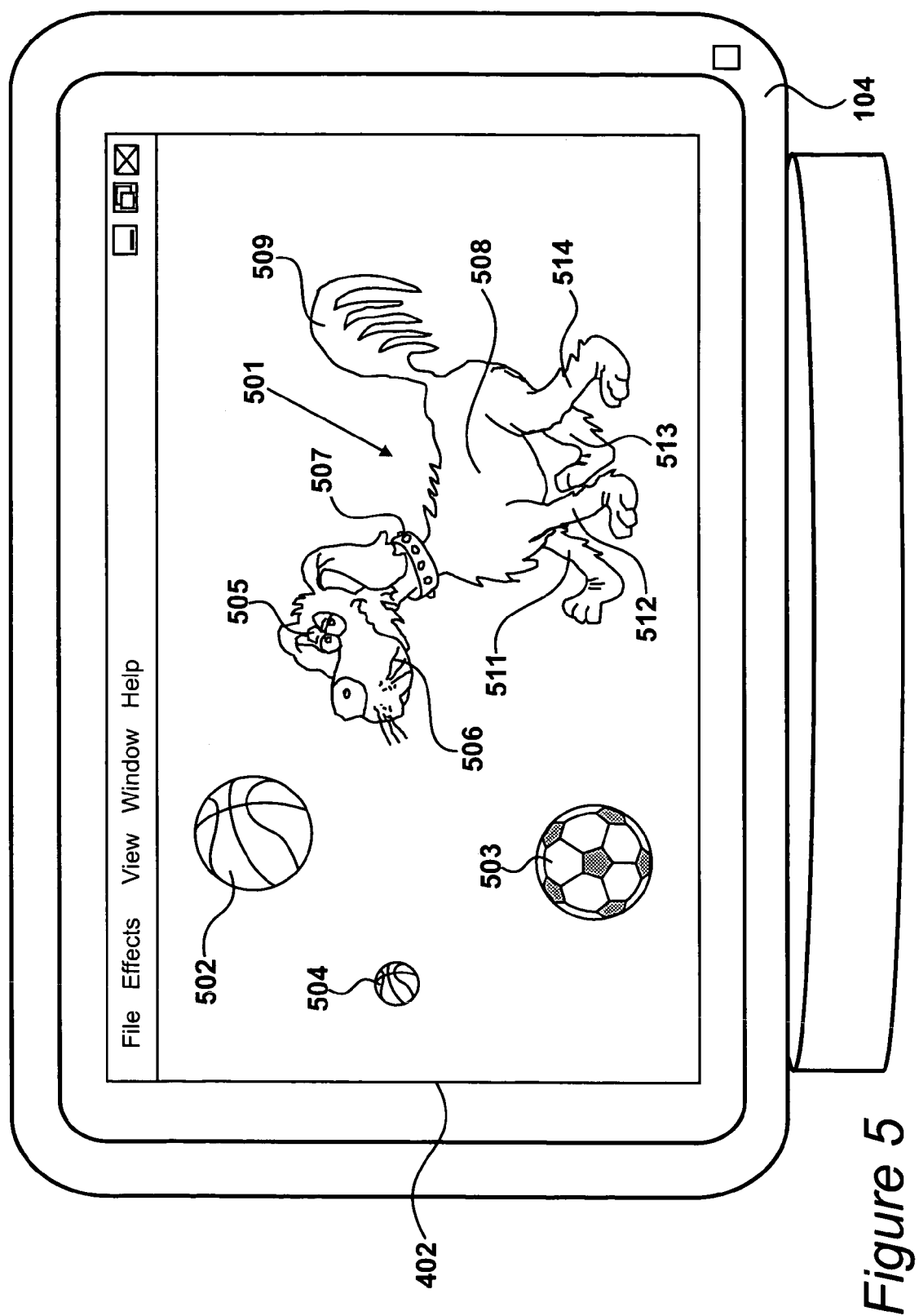
FIG. 5 shows a detail of part of the user interface shown in FIG. 4, according to one embodiment of the present invention.

Tile 402, according to one embodiment of the present invention, is detailed in FIG. 5 and illustrates a three-dimensional scene that is currently being manipulated by a user. In this example, described for the benefit of illustration only, the scene consists of an animatable dog 501 along with a first animatable ball 502, a second animatable ball 503 and a third animatable ball 504. Individual components of dog 501 may be animated independently. Thus, the dog's eyes 505 may be animated along with the dog's head 506 with respect to the dog's neck 507. Neck 507 may be animated with respect to the dog's body 508 and the dog's tail 509 may also be animated with respect to the dog's body 508. A first leg 511 may be animated with respect to the dog's body 508, a second leg 512 may be animated with respect to the dog's body, a third leg 513 may be animated with respect to the dog's body, and a fourth leg 514 may be animated with respect to the dog's body 508. Furthermore, each of said legs 511 to 514 consists of an upper portion, a lower portion and a foot.

FIG. 6

Figure 6:
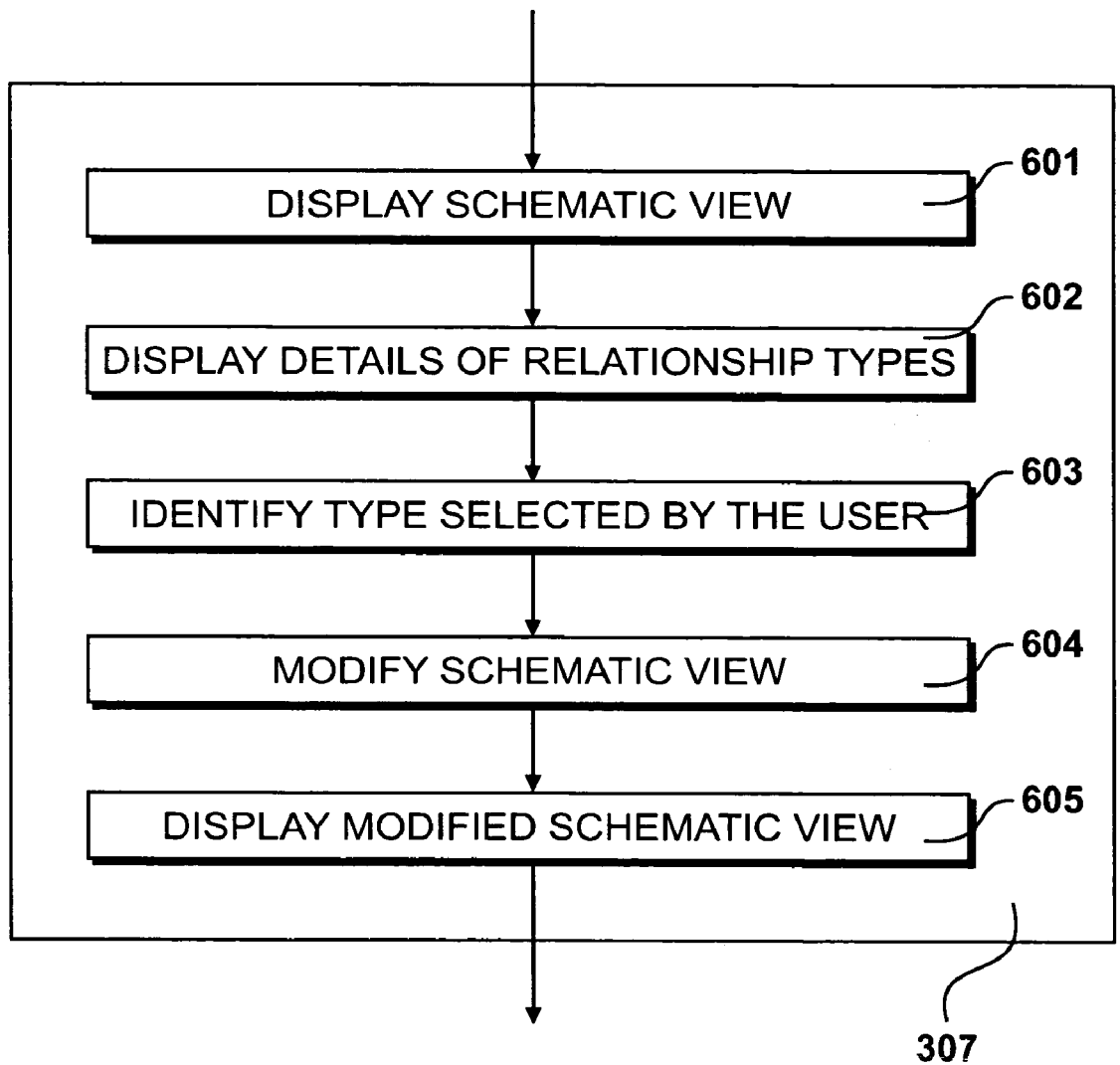
FIG. 6 shows a flow chart, according to one embodiment of the present invention.

FIG. 6 shows procedures performed at step 307, according to one embodiment of the present invention. At step 601 a schematic view is displayed to a user on visual display unit 104.

At step 602 details of relationship types are displayed to a user via visual display unit 104 and at step 603 a specific type selected by a user is identified.

At step 604 the schematic view displayed to the user is modified. The schematic view or representation shows an object or objects composed of elements in which each element is identified by a node in the schematic view and relationships between nodes are represented by links. The modification procedure performed at step 604 consists of modifying the nature of displayed links that represent the type of relationship that has been selected at step 603. The nature of this modification may take many forms and in the preferred embodiment the modification consists of changing the nature of an existing link or inserting new links to identify similar relationship types that are not necessarily connected in an animation context. At step 605, a modified schematic view is displayed on visual display unit 104.

FIG. 7

Figure 7:
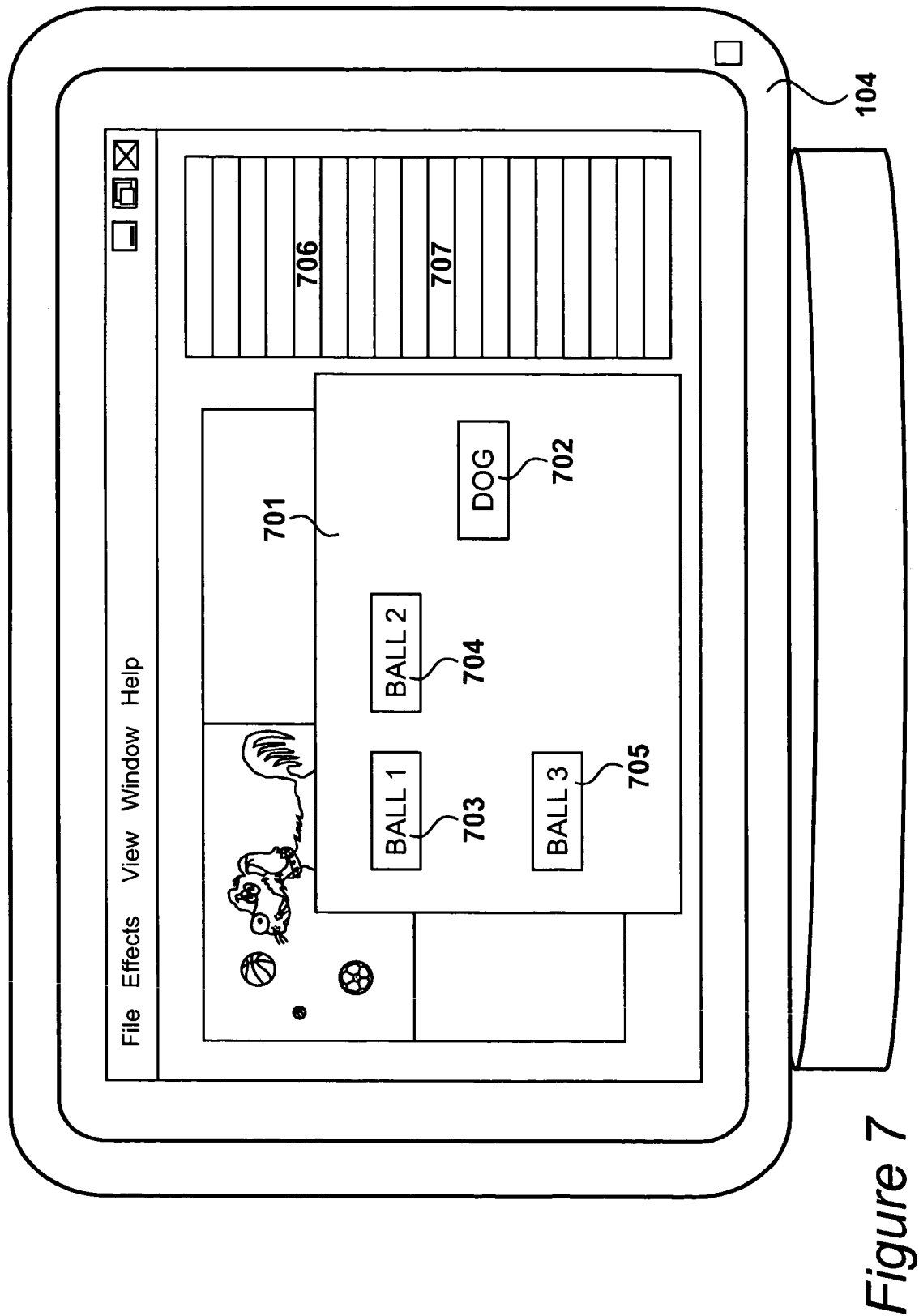
FIG. 7 shows an example of a schematic view, according to one embodiment of the present invention.

As previously stated, step 601 effects the display of a schematic view as shown in FIG. 7, according to one embodiment of the present invention. The schematic view is presented on visual display unit 104 in the form of a floating window 701. Each of the objects within the view is represented by a respective node. Such that the dog object 501 is represented by a dog node 702, ball object 502 is represented by ball 1 node 703, ball object 503 is represented by a ball 2 node 704 and ball object 504 is represented by a ball 3 node 705.

Figure 8:
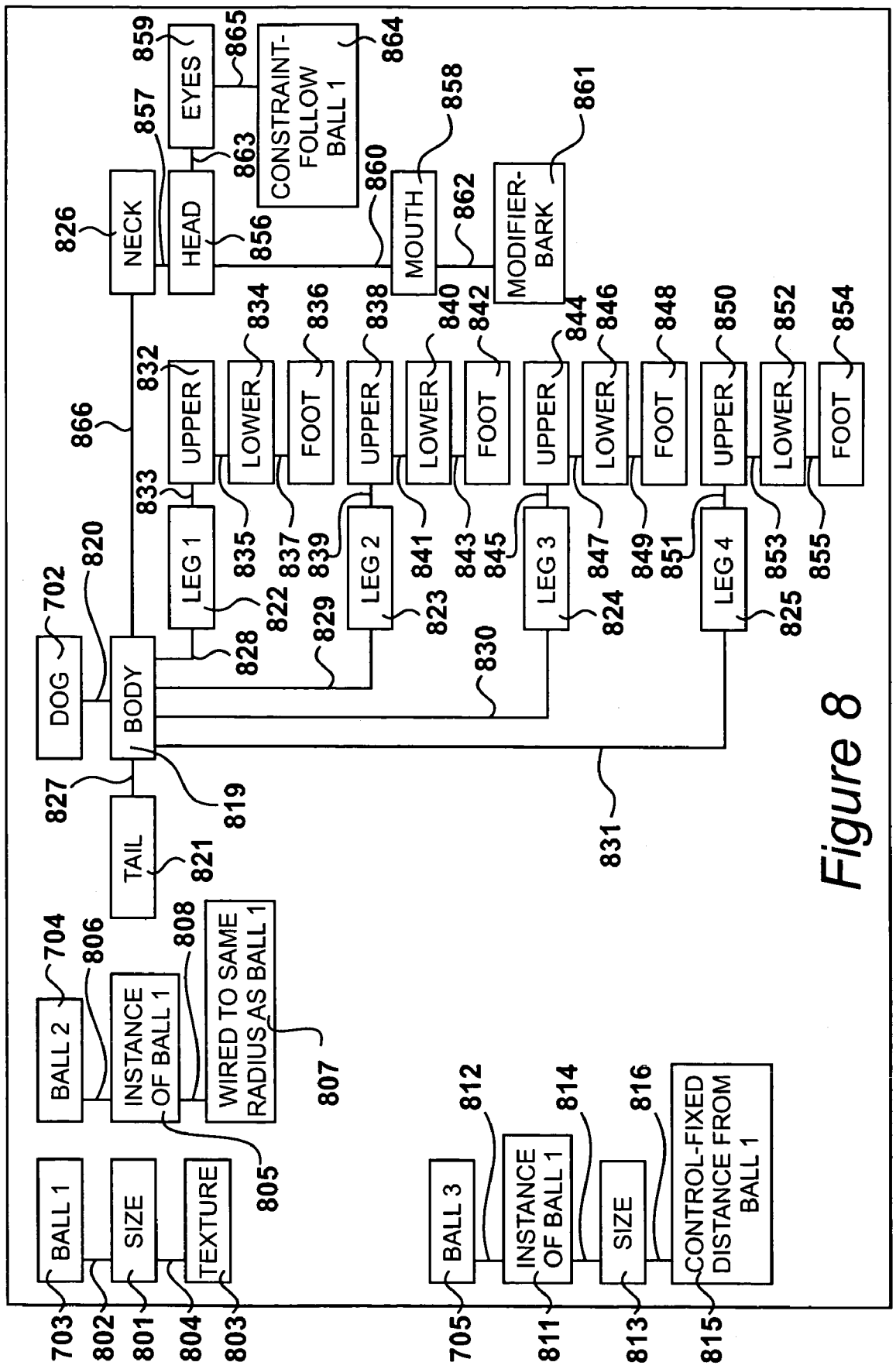
FIG. 8 shows an expanded version of the schematic view shown in FIG. 7, according to one embodiment of the present invention.

In response to operation of an appropriate menu function 706, the schematic view 701 is expanded to occupy the full screen of the visual display unit 104 and to display lower level related elements for each object as shown in FIG. 8.

Figure 9:
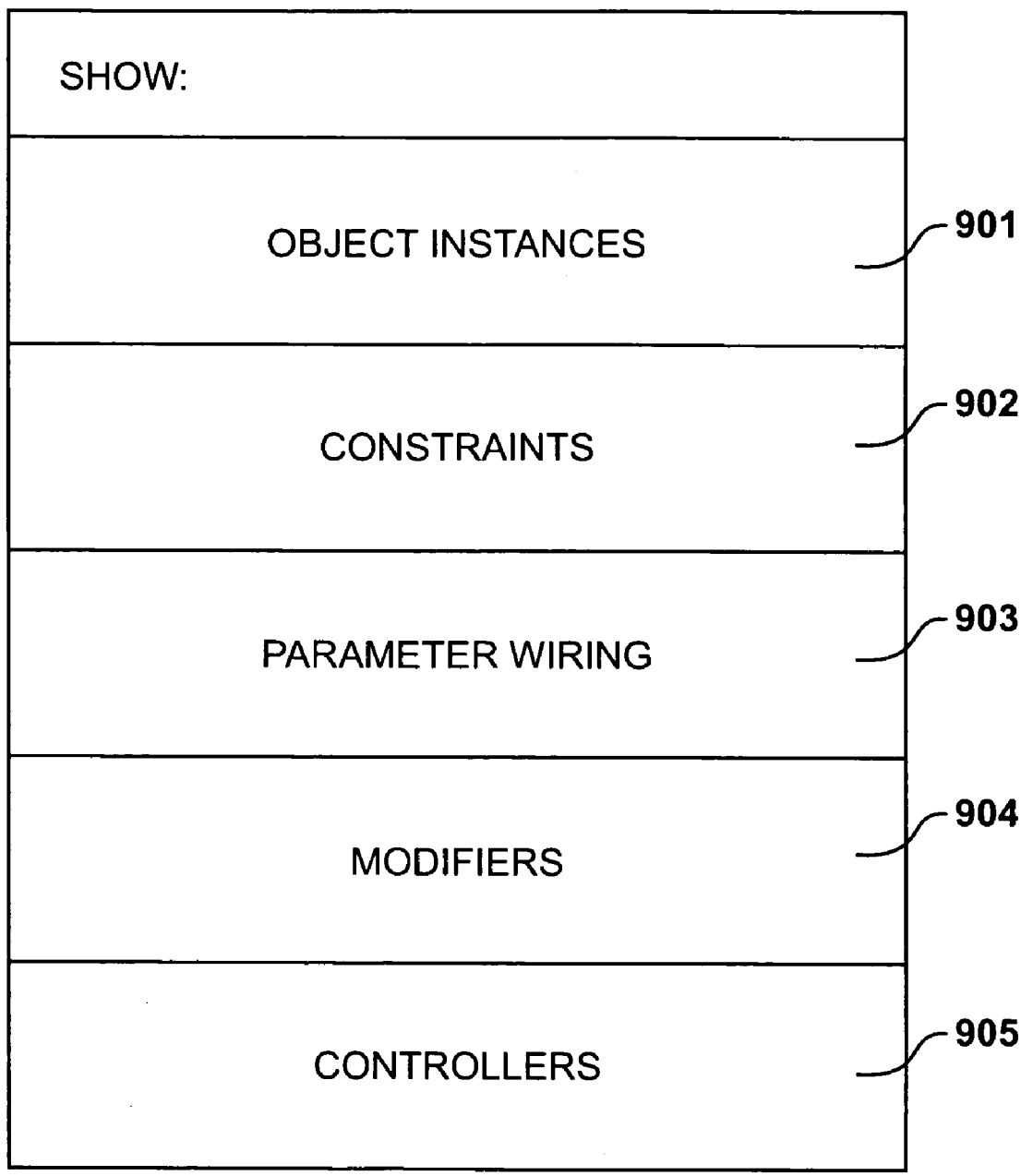
FIG. 9 shows menu options that can be selected in order to modify a schematic view, according to one embodiment of the present invention.

In response to operation of an appropriate menu function 707, a relationship types list is displayed as shown in FIG. 9.

FIG. 8

FIG. 8 shows an expanded schematic view as effected by step 601, according to one embodiment of the present invention, in which nodes 702, 703, 704 and 705 are present. However, each of these objects has been constructed from a plurality of elements representing the topology of the object along with other attributes such as textures and inter-relationships. In the schematic view, as shown in FIG. 8, each of these elements is represented by a node and the relationships between the nodes (elements) are represented by links that, topologically speaking, may be considered as arcs.

Ball 1 object 703 includes a node 801 linked to the ball object 703 via a link 802. Node 801 relates to the sizing of ball 1 such that the size of ball 1 may be controlled independently in response to additional data defined by a user. Ball 1 also has a texture applied thereto as identified by texture node 803 connected to node 801 via a link 804.

Ball 2 object 704 includes a node 805 linked to the ball object 704 via a link 806. Node 805 represents the fact that ball 2 is an instance of ball 1. Ball 2 is also wired to have the same radius as ball 1 as identified by node 807 connected to node 805 via a link 808.

Ball 3 object 705 includes a node 811 connected to the ball object via a link 812. Node 811 illustrates that ball 3 is an instance of ball 1. Ball 3 also has a node 813 relating to its size which is connected to node 811 via a link 814. A further node, 815, represents the fact that ball 3 is configured to remain a fixed distance from ball 1. Node 815 is connected to node 813 via a link 816.

Dog object 702 includes a node 819 connected to the dog object via a link 820. Node 819 relates to the body of the dog. Nodes 821, 822, 823, 824, 825 and 826 are all connected to body node 819. Node 821 relates to the tail and is connected to body node 819 via a link 827.

Node 822 relates to a first leg and is connected to body node 819 via a link 828. Node 823 relates to a second leg and is connected to body node 819 via a link 829. Node 824 relates to a third leg and is connected to body node 819 via a link 830. Node 825 relates to a fourth leg and is connected to body node 819 via a link 831.

Leg 1 node 822 includes a node 832 connected to node 822 via a link 833. Node 832 refers to the upper portion of the first leg. A node 834 is connected to node 832 via a link 835 and relates to the lower portion of leg 1. Further, there is a foot node 836 which is connected to node 834 via a link 837.

Leg 2 node 823 includes a node 838 connected to node 823 via a link 839. Node 838 refers to the upper portion of the second leg. A further node 840 is connected to node 838 via a link 841 and relates to the lower portion of leg 2. Further, there is a foot node 842 which is connected to node 840 via a link 843.

Leg 3 node 824 includes a node 844 connected to node 824 via a link 845. Node 844 refers to the upper portion of the third leg. A node 846 is connected to node 844 via a link 847 and relates to the lower portion of leg 3. Further, there is a foot node 848 which is connected to node 846 via a link 849.

Leg 4 node 825 includes a node 850 connected to node 825 via a link 851. Node 850 refers to the upper portion of the fourth leg. A node 852 is connected to node 850 via a link 853 and relates to the lower portion of leg 4. Further, there is a foot node 854 which is connected to node 852 via a link 855.

Node 826 relates to the neck and is connected to body node 819 via a link 866. Neck node 826 includes a head node 856 connected to neck node 826 via a link 857. Mouth node 858 and eyes node 859 are connected to head node 856.

Mouth node 858 is connected to head node 856 via a link 860. A further node 861 represents the fact that a modifier is applied to the mouth which causes it to be animated when a barking sound is generated. Modifier node 861 is connected to mouth node 858 via a link 862.

Eyes node 859 is connected to head node 856 via a link 863. A further node 864 is connected to eyes node 859 via a link 865 and represents a constraint upon eyes node 859 that the eyes must follow the path of ball 1.

FIG. 9

As previously stated, step 602 effects the display of details of relationship types on visual display unit 104. According to one embodiment of the present invention, there are a plurality of relationship types 901, 902, 903, 904 and 905 which are shown in FIG. 9 as menu options. An option is selected in response to user input.

Upon selection of relationship type 901, a window is displayed showing all object instances, which are separate versions of an object. If menu option 902 is selected, the various constraints specified are displayed, such as if one object follows the movements of another. Selection of relationship type 903 results in the display of information relating to parameter wiring, which allows parameters of one object to change automatically if parameters of a separate object are altered. If relationship type 904 is selected, modifiers information is displayed. Modifiers are other aspects of an animation such as sound which affect the visual scene. Upon selection of relationship type 905, controllers information is displayed.

FIG. 10

Figure 10:
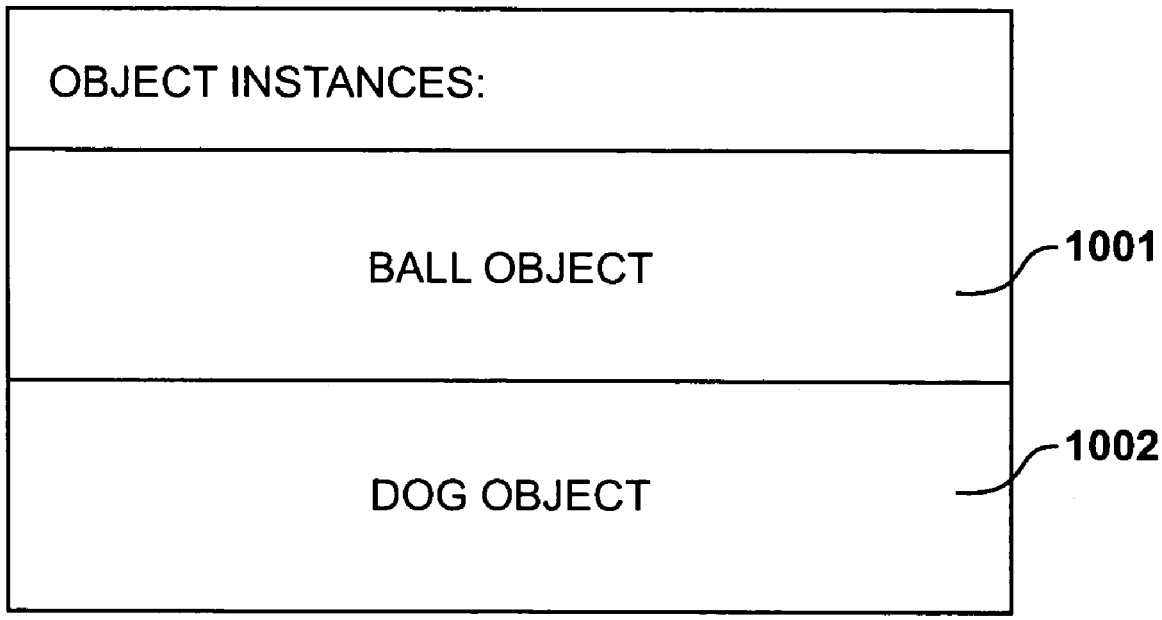
FIG. 10 shows an object instances display, according to one embodiment of the present invention.

As previously described, when selection data is received in response to user input selecting relationship type 901, information is displayed on visual display unit 104 relating to object instances. FIG. 10 shows information diplayed on visual display unit 104, according to one embodiment of the present invention. The types of object instances in this embodiment are ball object shown at list item 1001, and dog object shown at list item 1002.

FIG. 11

Figure 11:
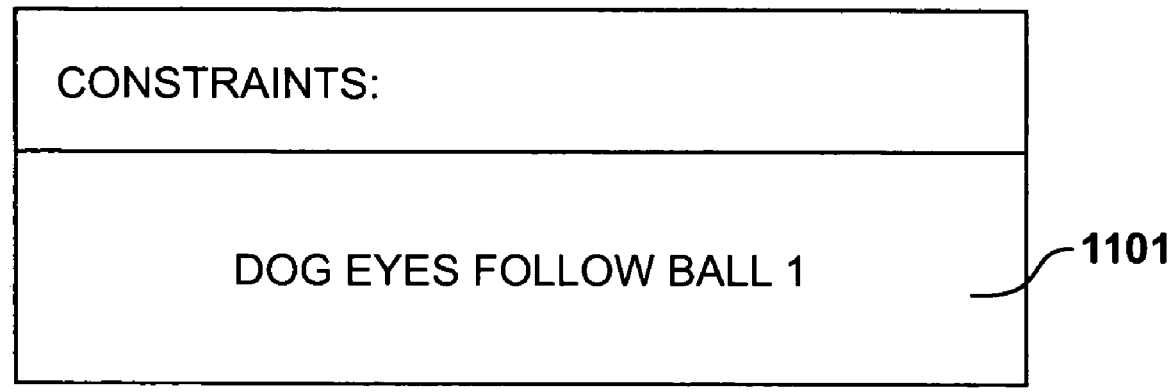
FIG. 11 shows a constraints display, according to one embodiment of the present invention.

When selection data is received in response to user input selecting relationship type 902, information is displayed on visual display unit 104 relating to constraints on objects. FIG. 11 shows the information that would be displayed for this example, according to one embodiment of the present invention. The constraint displayed here is list item 1101 and relates to the dog eyes following ball 1.

FIG. 12

Figure 12:
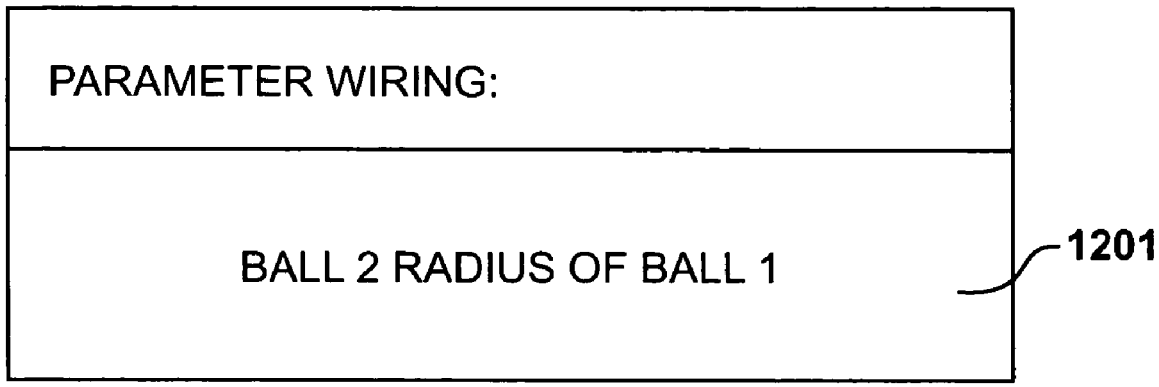
FIG. 12 shows a parameter wiring display, according to one embodiment of the present invention.

When selection data is received in response to user input selecting relationship type 903, information is displayed on visual display unit 104 relating to parameter wiring of the objects. FIG. 12 shows the information that would be displayed for this example, according to one embodiment of the present invention. As shown at list item 1201, the wiring in this example maintains the radius of ball 2 to equal the radius of ball 1.

FIG. 13

Figure 13:
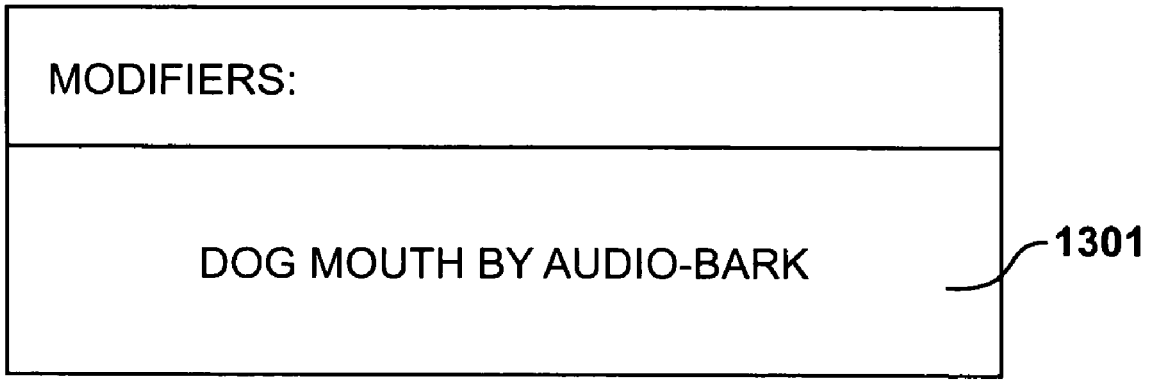
FIG. 13 shows a modifiers display, according to one embodiment of the present invention.

When selection data is received in response to user input selecting relationship type 905, information is displayed on visual display unit 104 relating to modifiers. FIG. 13 shows the information that would be displayed for this example, according to one embodiment of the present invention. List item 1301 shows that, in this example, the dog's mouth is modified by an audio signal representing a bark.

FIG. 14

Figure 14:
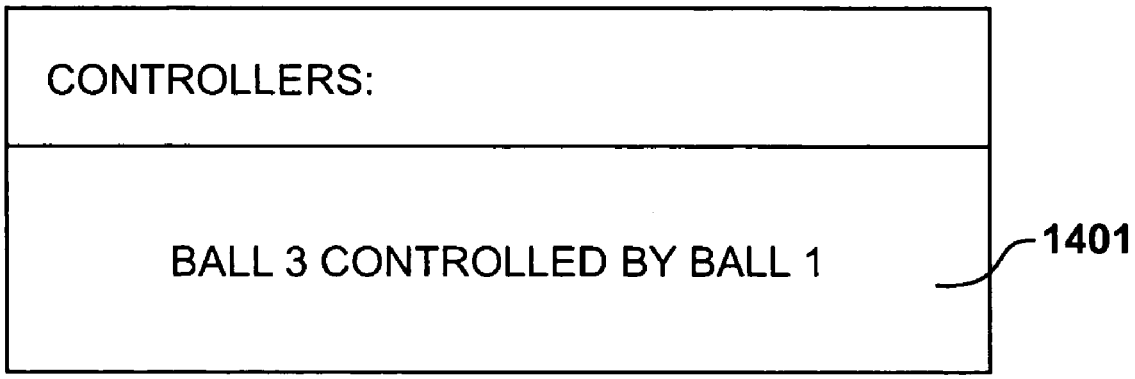
FIG. 14 shows a controllers display, according to one embodiment of the present invention.

When selection data is received in response to user input selecting relationship type 906, information is displayed on visual display unit 104 relating to controllers. FIG. 14 shows the information that would be displayed for this example, according to one embodiment of the present invention. List item 1401 shows that in this example ball 3 is controlled by ball 1 as it must remain a fixed distance from it.

FIG. 15

Figure 15:
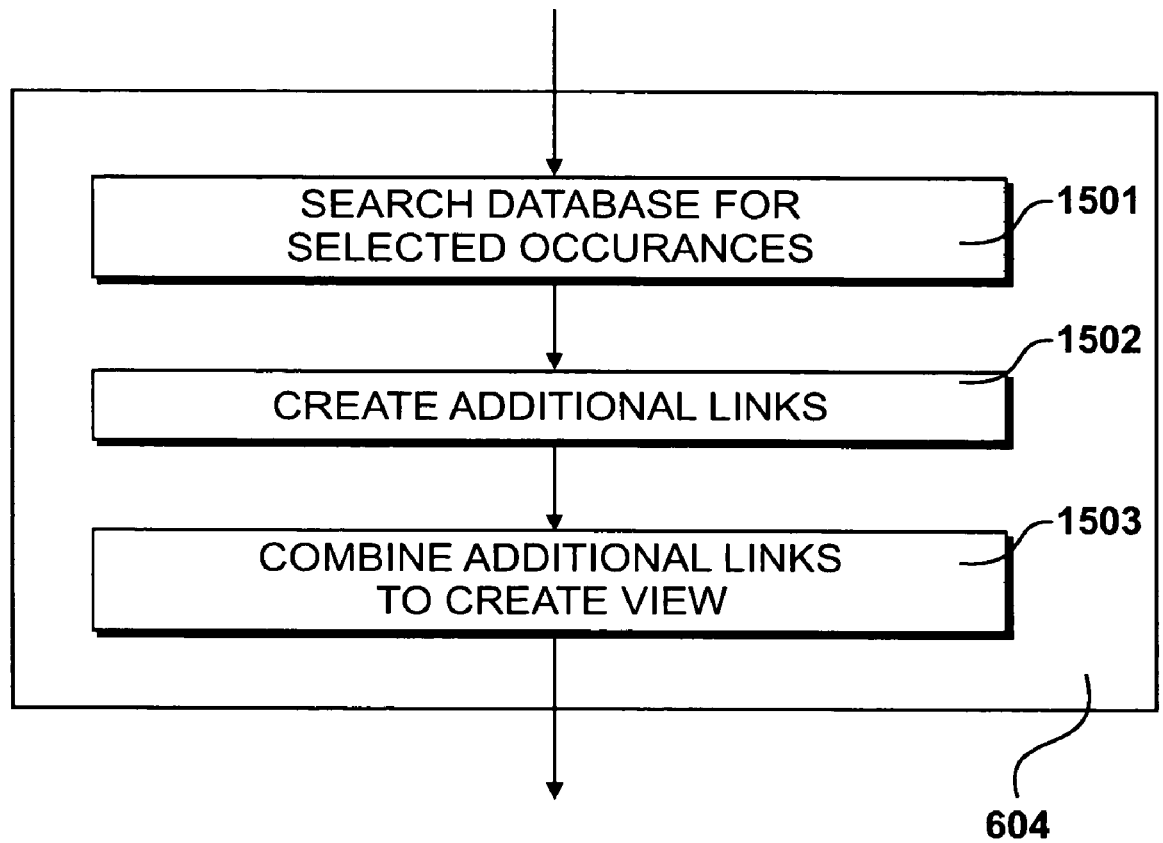
FIG. 15 shows an expansion of part of FIG. 6, according to one embodiment of the present invention.

Step 604 which describes the modification of the schematic view, is shown in an expanded form in FIG. 15, according to one embodiment of the present invention. At step 1501, a search is conducted of the database for selected occurrences. At step 1502, additional links can be created, which are then combined at step 1503 to create a modified view.

FIG. 16

Figure 16:
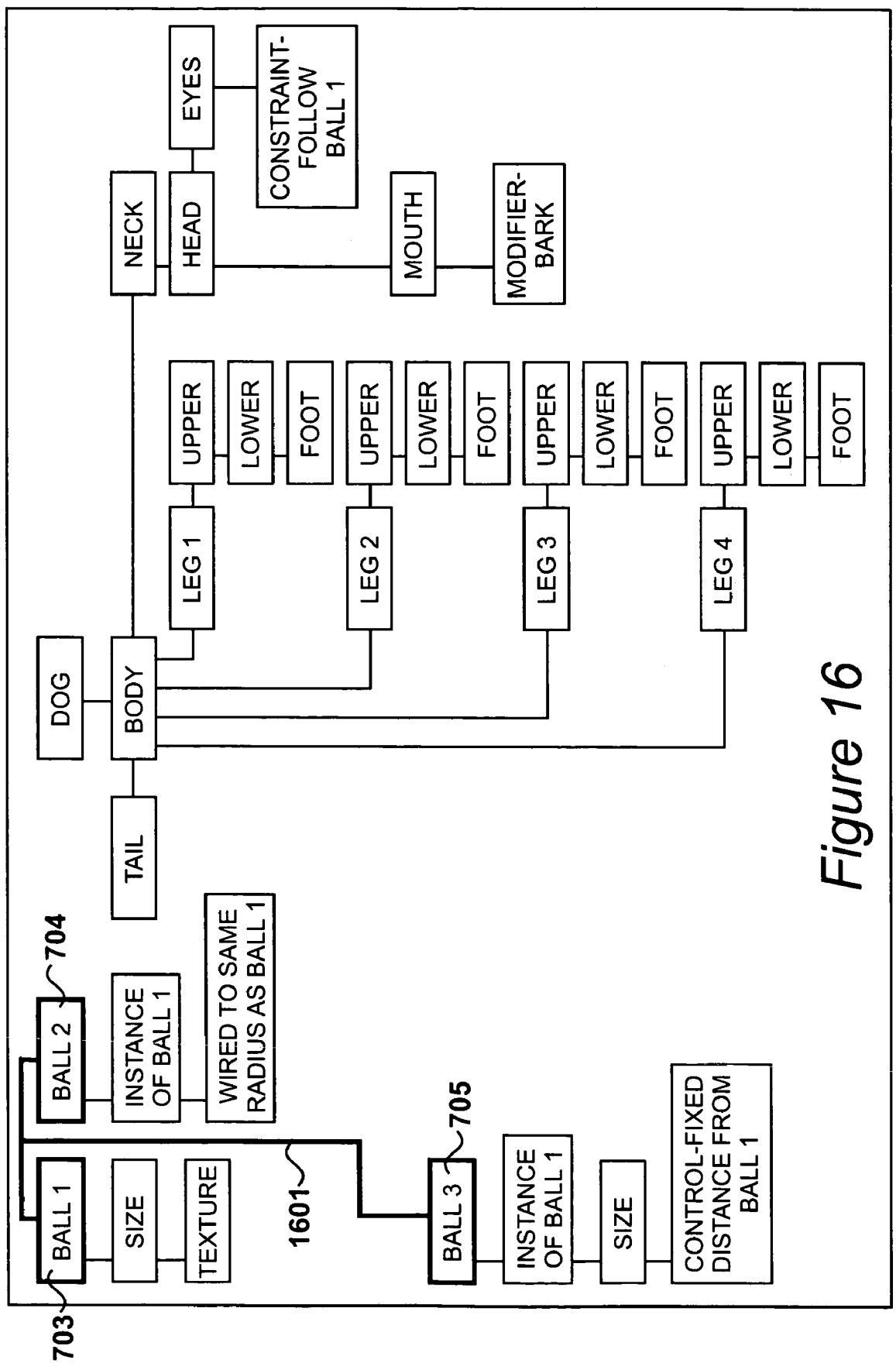
FIG. 16 shows a first modified schematic view, according to one embodiment of the present invention.

FIG. 16 shows a modified version of the schematic view in FIG. 8, according to one embodiment of the present invention. This version would be displayed upon selection of list item 1001. Nodes 703, 704 and 705 are linked by an additional link 1601, which represents the fact that they are all instances of the ball object as selected at list item 1001.

FIG. 17

Figure 17:
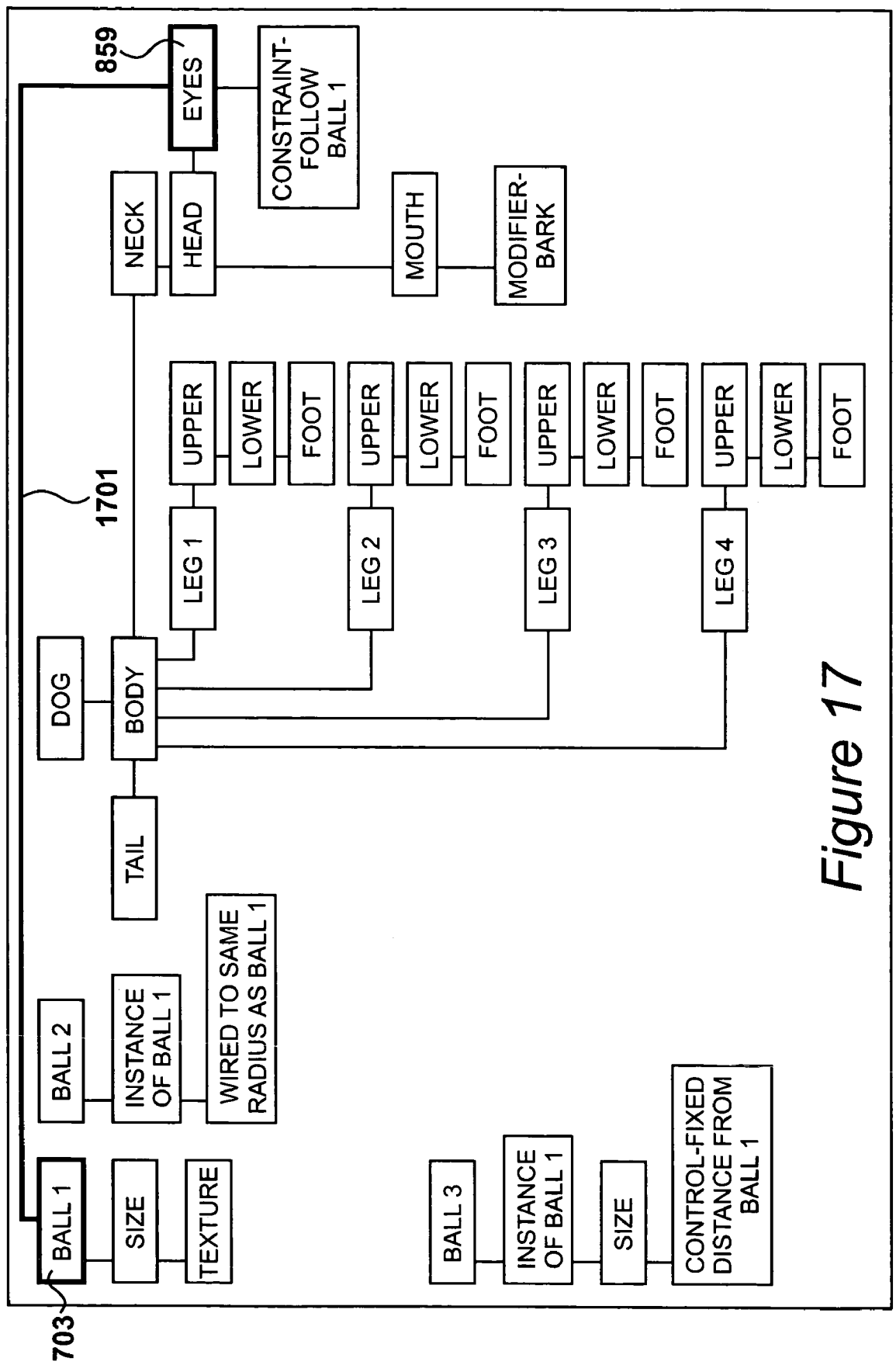
FIG. 17 shows a second modified schematic view, according to one embodiment of the present invention.

FIG. 17 shows a modified version of the schematic view in FIG. 8, according to one embodiment of the present invention. This version would be displayed upon selection of list item 1101. Ball 1 node 703 is connected to eyes node 859 via an additional link 1701. This represents the constraint upon the eyes to follow ball 1.

FIG. 18

Figure 18:
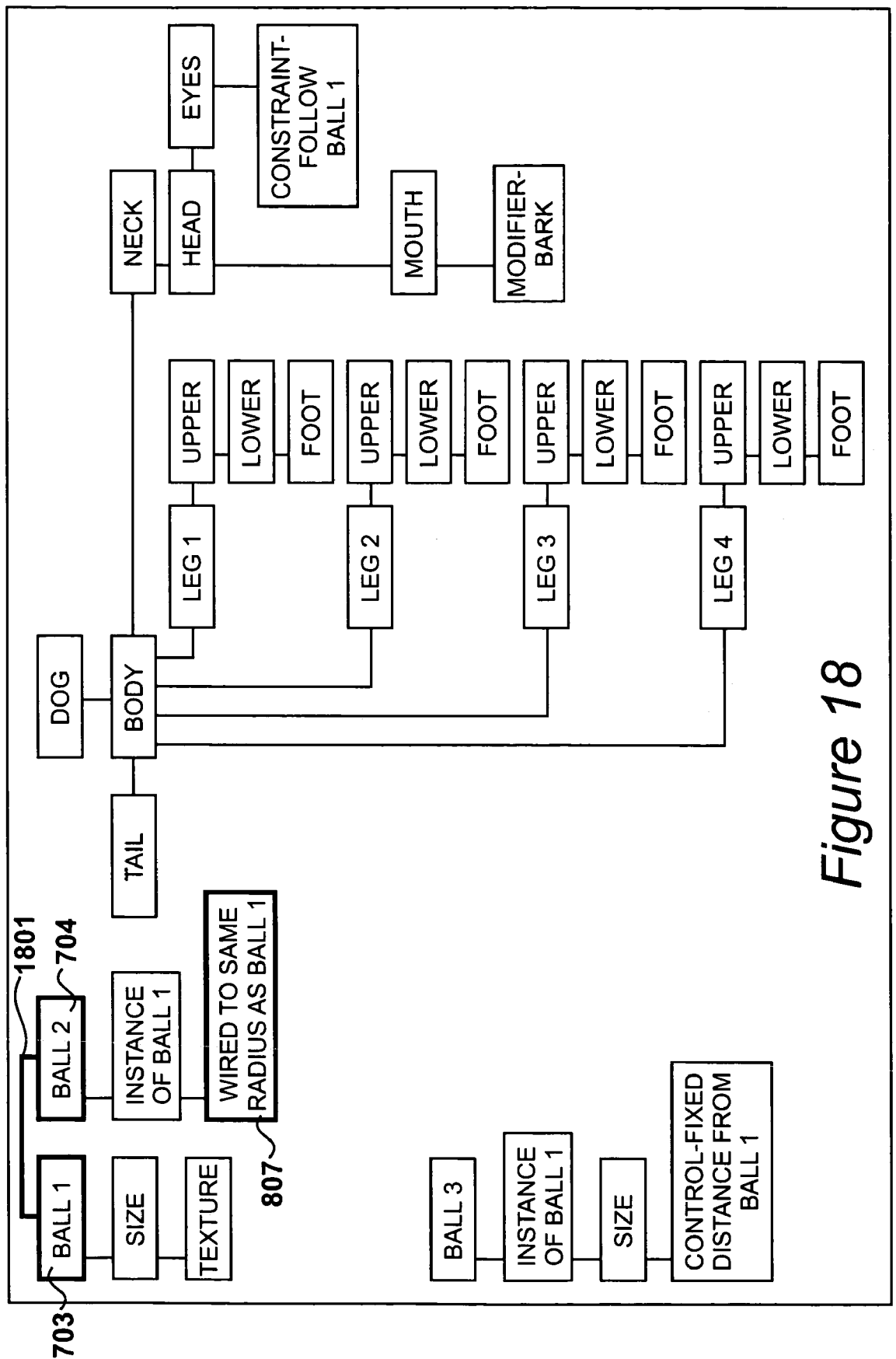
FIG. 18 shows a third modified schematic view, according to one embodiment of the present invention.

FIG. 18 shows a modified version of the schematic view in FIG. 8, according to one embodiment of the present invention. This version would be displayed upon selection of list item 1201. Ball 1 node 703 is connected to ball 2 node 704 via an additional link 1801. Link 1801 represents the parameter wiring which results in ball 2 retaining the same radius as ball 1. Further, node 807 is highlighted to illustrate that ball 2 is wired to have the same radius as ball 1.

FIG. 19

Figure 19:
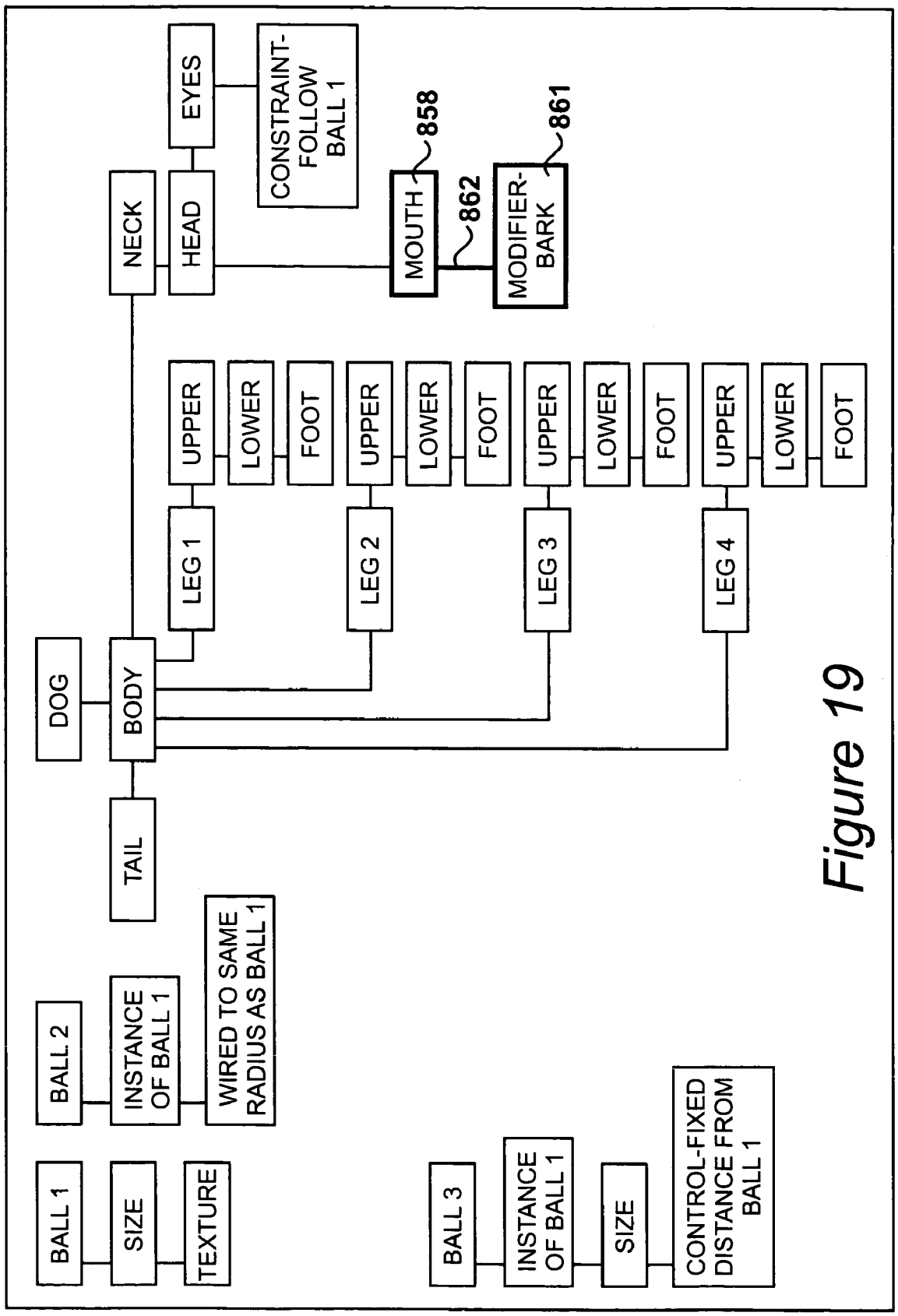
FIG. 19 shows a fourth modified schematic view, according to one embodiment of the present invention.

FIG. 19 shows a modified version of the schematic view in FIG. 8, according to one embodiment of the present invention. This version would be displayed upon selection of list item 1301. Link 862 which connects mouth node 858 with modifier node 861 is highlighted here to illustrate the modification which the audio system performs.

FIG. 20

Figure 20:
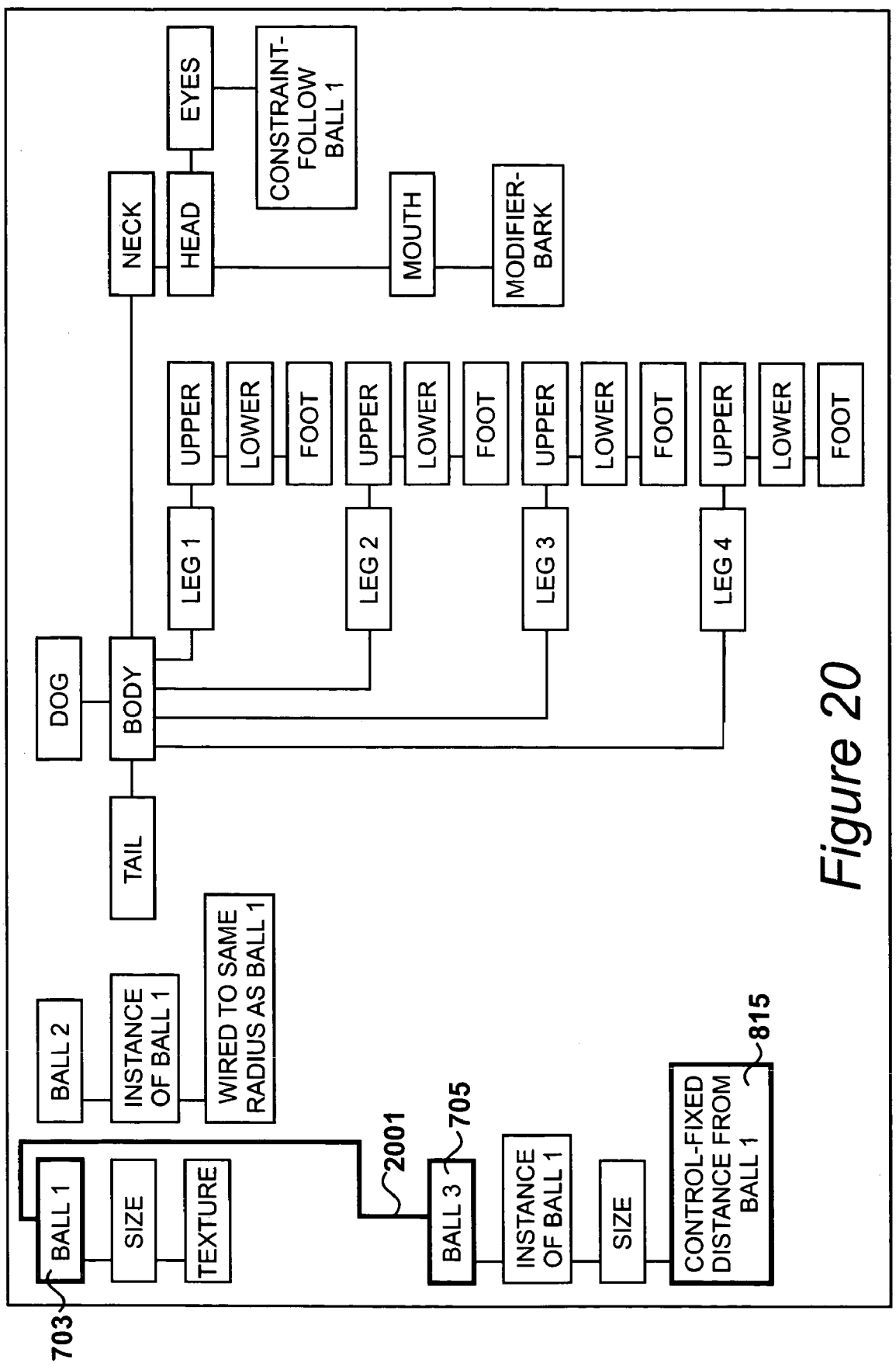
FIG. 20 shows a fifth modified schematic view, according to one embodiment of the present invention.

FIG. 20 shows a modified version of the schematic view in FIG. 8, according to one embodiment of the present invention. This version would be displayed upon selection of list item 1401. Ball 1 node 703 is connected to ball 3 node 705 via an additional link 2001. Further, node 815 is highlighted to illustrate that a controller ensures that ball 3 remains a fixed distance from ball 1.

The invention has been described above with reference to specific embodiments. Persons skilled in the art will recognize, however, that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A computer readable medium storing instructions that, when executed by a processor, cause the processor to display a schematic representation of a scene, by performing the steps of:
   displaying a first schematic representation of the scene that includes a plurality of animated objects, each animated object including a plurality of elements connected by arcs, wherein at least one element corresponds to a visible part of the animated object and at least one other element corresponds to a constraint, a parameter wiring, a modifier, or a controller, and each arc representing a relationship type between a particular element connected to one side of the arc and another element connected to the other side of the arc;
   receiving a menu selection of data input specifying one relationship type of a plurality of relationship types;
   adding a first link, based on the selection data input, that connects two or more animated objects that are present in the first schematic representation of the scene and not already connected by a link, to produce a second schematic representation of the scene; and
   displaying the second schematic representation of the scene that includes the two or more animated objects and the first link connecting the two or more animated objects.

2. The computer readable medium of claim 1, wherein adding the first link that connects two or more animated objects that are not already connected by a link includes identifying relationship types between animated objects that are not connected in an animation context.

3. The computer readable medium of claim 1, wherein the first link is highlighted when displaying the second schematic representation of the scene.

4. The computer readable medium of claim 1, further comprising the steps of:
   modifying the appearance of a first element of a first animated object based on the selection data to produce a modified first element; and
   displaying the modified first element in the second schematic representation of the scene.

5. The computer readable medium of claim 1, further comprising the step of displaying a menu including the plurality of relationship types for selection of the one relationship type to produce the selection data input.

6. The computer readable medium of claim 1, wherein the first and second schematic representations of the scene have a hierarchical structure.

7. The computer readable medium of claim 1, wherein the plurality of relationship types includes a modifier relationship type.

8. The computer readable medium of claim 1, wherein the plurality of relationship types includes a controller relationship type.

9. The computer readable medium of claim 1, wherein the plurality of relationship types includes an object instance relationship type.

10. The computer readable medium of claim 1, wherein the plurality of relationship types includes a parameter wiring relationship type.

11. The computer readable medium of claim 1, wherein the plurality of relationship types includes a constraint relationship type.

12. A method for displaying a schematic representation of a scene, the method comprising:

displaying a first schematic representation of the scene that includes a plurality of animated objects, each animated object including a plurality of elements connected by arcs, wherein at least one element corresponds to a visible part of the animated object and at least one other element corresponds to a constraint, a parameter wiring, a modifier, or a controller, and each arc representing a relationship type between a particular element connected to one side of the arc and another element connected to the other side of the arc;

receiving a menu selection of data input specifying one relationship type of a plurality of relationship types;

adding a first link, based on the selection data input, that connects two or more animated objects that are present in the first schematic representation of the scene and not already connected by a link, to produce a second schematic representation of the scene; and displaying the second schematic representation of the scene that includes the two or more animated objects and the first link connecting the two or more animated objects.

13. The method of claim 12, wherein adding the first link that connects two or more animated objects that are not already connected by a link includes identifying relationship types between animated objects that are not connected in an animation context.

14. The method of claim 12, further comprising the step of searching a database corresponding to the scene to identify arcs representing the one relationship type.

15. The method of claim 12, further comprising the steps of:

modifying the appearance of a first element of a first animated object based on the selection data to produce a modified first element; and displaying the modified first element in the second schematic representation of the scene.

16. The method of claim 12, further comprising the step of displaying a menu including the plurality of relationship types for selection of the one relationship type to produce the selection data input.

17. A system for displaying a schematic representation of a scene, the system comprising:

means for displaying a first schematic representation of the scene that includes a plurality of animated objects, each object including a plurality of elements connected by arcs, wherein at least one element corresponds to a visible part of the animated object and at least one other element corresponds to a constraint, a parameter wiring, a modifier, or a controller, and each arc representing a relationship type between a particular element connected to one side of the arc and another element connected to the other side of the arc;

means for receiving a menu selection of data input specifying one relationship type of a plurality of relationship types;

means for adding a first link, based on the selection data input, that connects two or more animated objects that are present in the first schematic representation of the scene and not already connected by a link, to produce a second schematic representation of the scene; and means for displaying the second schematic representation of the scene that includes the two or more animated objects and the first link connecting the two or more animated objects.

18. The computer system of claim 17, wherein adding the first link that connects two or more animated objects that are not already connected by a link includes identifying relationship types between animated objects that are not connected in an animation context.

19. The system of claim 17, further comprising means for searching a database corresponding to the scene to identify arcs representing the one relationship type.

20. The system of claim 17, further comprising means for displaying a menu including the plurality of relationship types for selection of the one relationship type to produce the selection data input.

* * * * *